United States Patent [19]

High et al.

[11] 3,918,984

[45] Nov. 11, 1975

[54] COATING COMPOSITION

[75] Inventors: Gerald S. High, Detroit; Bhimashanker G. Dhake, Livonia, both of Mich.

[73] Assignee: M & T Chemicals Inc., Greenwich, Conn.

[22] Filed: Sept. 21, 1973

[21] Appl. No.: 399,376

[52] U.S. Cl. ............................ 106/290; 106/308 F
[51] Int. Cl.² ............................................ C09C 1/64
[58] Field of Search ..... 106/290, 291, 308 Q, 308 F

[56] References Cited
UNITED STATES PATENTS
3,551,174  12/1970  Hauska et al. ..................... 106/290

*Primary Examiner*—Patrick P. Garvin
*Assistant Examiner*—J. V. Howard
*Attorney, Agent, or Firm*—Kenneth G. Wheeless; Robert P. Auber

[57] ABSTRACT

This invention relates to aqueous coating compositions comprising non-leafing aluminum and a combination of certain non-ionic surfactants.

11 Claims, No Drawings

COATING COMPOSITION

This invention is a stable wet pigment or paste which is composed essentially of a water vehicle or menstrum in which is dispersed non-leafing aluminum flake powder pigment. The product of this invention is relatively stable and when used to pigment an aqueous base coating produces a relatively stable coating composition in which the aluminum flakes do not undergo substantial deterioration over long periods.

The invention further relates to stable aqueous coatings containing aluminum flakes. "Non-leafing," as that term is used herein and in the appended claims, is meant aluminum flake powder pigments the capacity of which to leaf in a paint vehicle is not sufficient to produce in the resulting paint or coating the characteristic specular brightness produced by the leading type aluminum pigments. These non-leafing aluminum pigments have many well known uses for protective and for decorative purposes. Herein, and in the appended claims, the term coating is used in a broad sense to denote mixtures of pigment and carrier or vehicle, the mixtures being of the type used on, or applied to, surfaces to create therein protective or a decorative effect.

BACKGROUND OF THE INVENTION

The problem to which this invention is directed arises from the well known fact that aluminum flake powder pigment has been, with a few exceptions, limited in use to pigment systems which are essentially non-aqueous in character. In addition, when the known pastes or wet pigments of commerce have been manufactured by ball milling, or by other means of attrition, in the presence of a liquid it has heretofore been necessary to use non-aqueous liquids. The reason for the use of non-aqueous systems in connection with aluminum flake powder pigments is the fact that in the presence of water aluminum flake particles undergo rapid change, presumably due to oxidation, with the result that the usefulness of the flake as a pigment is destroyed in a relatively short time. Therefore few aqueous paint or coating systems which contain aluminum flake as a pigment have been useable in commerce. Where, for some reason, an aluminum flake pigment must be applied in a carrier or vehicle containing water it has been customary to avoid adding the aluminum flake to the system until immediately prior to its use and, thereafter, to complete the painting or coating operation as quickly as possible to minimize depreciation of the pigment.

The wet pigments produced by the methods of this invention are relatively stable in contact with water to distinguish them from the heretofore known aluminum flake powder pigment which is, as aforesaid, highly unstable in contact with water. Generally when an aluminum flake powder pigment is placed in an aqueous vehicle such as, for instance, in water, or in aqueous emulsions in aqueous systems of the type widely used in paints such as acrylic, polyvinyl acetate, butadiene-styrene, casein, alkyd and copolymer dispersions, the result is a violent reaction, usually delayed from a few hours to as long as one or two weeks, which reaction results in the virtual destruction of the aluminum flake as a pigment and usually in its reduction to a discolored pulp or mass. This reaction is accompanied by the evolution of gas which often reaches explosive levels if the paint is, as usual, packaged in a sealed container. On the contrary the wet pigments which are the product of this invention are stable in the sense that either, as such, or as a pigment in an aqueous paint vehicle, they do not undergo gross degradation of their pigment properties such as reflectivity and coverage and maintain the physical integrity of the component aluminum flakes over a period of months. They therefore possess sufficient stability to permit of commercially significant time intervals between manufacture and use and thus to permit of distribution and sale including a relatively long shelf life.

The primary objective of this invention is to provide aluminum flake pigment formulations characterized by substantial freedom from gas pressure development in the presence of appreciable quantities of available water.

SUMMARY OF THE INVENTION

This invention is an aqueous non-leafing aluminum flake composition containing a surfactant combination consisting essentially of:

a. a partial ester of a long chain fatty acid and a polyhydroxylic organic compound; and b. an ethoxylated partial ester of a long chain fatty acid and a polyhydroxylic organic compound.

Operable polyhydric organic compounds are hexitols and the cyclic inner ethers thereof, particularly the esters of the mixed cyclic inner ether sorbitan. These partial esters may be prepared by any one of several known methods; such as by direct esterification of the polyhydroxy material with free fatty acid or by alcoholysis of naturally occurring esters with polyhydroxy material, using suitable catalysts. With heat-sensitive polyhydroxylic compounds, the acid chlorides and pyridine or other suitable base may be employed. The esters are obtained by combining water-insoluble organic fatty acids having at least 12 carbon atoms, such as those obtainable by hydrolysis of natural fats, oils, and waxes, or from the oxidation of paraffins, with the suitable aliphatic polyhydroxylic compounds.

Preferred fatty acids are those combined with glycerine in linseed oil.

Linseed fatty acids which form the partial esters of the anhydrosorbitols of this invention include:
stearic, palmitic, oleic, ricinoleic,
linoleic, linolenic, and lauric acids.

Linseed contains the following percentages of saturated acids:

|  | Percent |
|---|---|
| palmitic | 4 – 7 |
| stearic | 2 – 5 |
| arachidic | 0.3 – 0.9 |
| lignoceric | trace | and the following percentages of unsaturated acids:

|  | Percent |
|---|---|
| oleic | 12 – 34 |
| linoleic | 7 – 27 |
| linolenic | 35 – 65 |

Sorbitol is produced by the hydrogenation of glucose. The linseed fatty acid esters of sorbitan of this invention are obtained by esterifying a mixture of anhydrosorbitols.

The esters of the present invention are of the monomeric cyclic inner ethers of sorbitol. The formation of the ethers from the alcohols involves dehydration which may be accomplished by heating and driving off water. The splitting off of water from 2 hydroxyls attached to polyhydric alcohols can proceed both internally and externally. In internal etherification the two hydroxyls are both attached to the same molecule of polyhydric alcohol, formation of the ether link leads to oxide or carbon-oxygen rings. The disposition of the hydroxyl groups allows the formation of rings having four to seven members, by internal etherification to produce cyclic internal ethers.

It is to be understood that wherever in this specification the term "sorbitan" is employed, this term does not necessarily mean a single chemical compound but may refer to a mixture of several anhydro derivatives falling therein. Thus sorbitan is not necessarily a single monoanhydrosorbitol but may comprise several isomeric monoanhydrosorbitols.

The mono-esters of the inner ethers may be prepared directly from the hexahydric alcohols, the reaction being carried out under conditions that assure the formation of the inner ether from the hexahydric alcohol and the esterification of the inner ether with the fatty acid, or they may be prepared directly from the inner ethers themselves by esterification thereof under appropriate conditions.

The polyoxyethylene sorbitan partial esters of this invention may be synthesized by forming partial esters of at least one of the following anhydrosorbitols of the formulae:

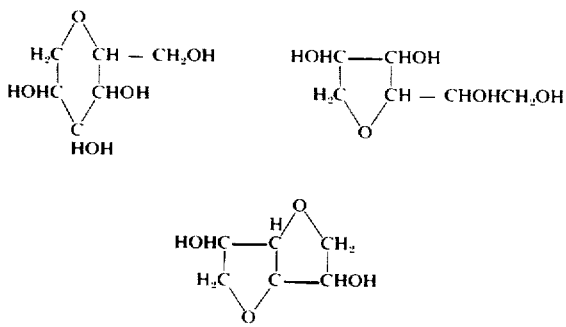

and etherification of at least two hydroxyl groups of the foregoing with ethylene oxide.

The linseed fatty acid ester of sorbitan as defined herein may also contain phosphatidyl choline, phosphatidyl ethanolamine, phosphatidyl serine, phosphatidyl inositol, as well as triglycerides of fatty acids, and carbohydrates.

The ratio of 1 part by weight to 7 parts by weight of linseed fatty acid ester of sorbitan to 0.5 parts to 3 parts by weight of ethoxylated fatty acid ester of sorbitan is operable for the purposes of this invention.

The weight ratio of surfactant combination to non-leafing aluminum ranges from 0.15 to 0.45.

According to a preferred embodiment this invention relates to an aqueous non-leafing aluminum flake composition containing a. a surfactant combination consisting essentially of from 1 part by weight to 7 parts by weight of at least one linseed fatty acid ester of sorbitan;

b. and from 0.5 parts to 2 parts by weight of polyoxyethylene sorbitan monolaurate, the ratio of surfactant combination to non-leafing aluminum being from 0.15 to 0.4.

Water reducible coating vehicular resins that may be used in practicing this invention include acrylic latices as well as alkyd modified latices, polyesters and other thermosetting polymers.

Typical acrylic components include methyl methacrylate, butyl acrylate, hydroxy propyl methacrylate, acrylonitrile and acrylic acid. Butadiene styrene, acrylic ester resins, and polyvinyl acetate homo and copolymers are examples of essentially solid film-forming agents, which in suspension in water from solid-in-liquid emulsions designated herein and in the prior art "latex" type vehicles. Alkyd resins and tar products are examples of essentially liquid film-forming agents, which in suspension in water can form liquid-in-liquid emulsions designated herein and in the prior art "emulsion" type vehicles. Both general types or classes of vehicles above described, whether constituting solid-in-liquid or liquid-in-liquid "latex" or "emulsion" type vehicles, respectively, contain appreciable amounts of water and are hereinafter referred to in the specification and claims as "water reducible" vehicles, which are ordinarily characterized by their incapability of admixture with aluminum flake pigmentation, in the absence of pressure-development in sealed containers of such formulations. Various conventional materials such as fillers, pigments and other colorants, thickening agents, etc., may be added to the latices as is well known in the coating art. Thus, non-leafing aluminum flakes stabilized with certain non-ionic surfactants may be incorporated in a variety of water reducible resins.

According to another of its aspects, this invention is an improved aqueous coating composition comprising a water reducible film forming polymer with non-leafing aluminum particles dispersed therein in the presence of a surfactant combination consisting essentially of a. a linseed fatty ester of sorbitan; and b. an ethoxylated linseed fatty ester of sorbitan.

In accordance with commercial practice in the paint industry, it is within conventional practices to include antifoaming agents, color-imparting compounds and viscosity controlling agents in water base flowable coating formulations. To this end one or more agents and/or compounds may be included in metallic flake paste pigments and ready-mixed coating formulations falling within the scope of the invention without detracting from the beneficial presence of the surfactant system of this invention.

Color-imparting compounds which may be added in amounts of 5 to 50 percent by weight of the ready-mixed coating formulations have included conventional insoluble organic and inorganic dry pigments, flushed colors, and colors-in-oil, in addition to viscosity-controlling agents such as a 3 percent in water solution of methylcellulose, with the latter compound present in amounts between 0.1 and 8 percent by weight of the ready-mixed formulations.

Silicone antifoaming agents in amounts of 0.01 to 1–5 percent by weight of the water-containing or water base metallic flake pigment coating formulations may also be successfully employed in the practice of the invention.

The present invention is applicable to the incorporation of aluminum flakes, i.e. comprising metallic aluminum powder, in a variety of water-dispersed coating compositions, which involve one or more film-forming agents of essentially water-insoluble character disposed in uniform suspension in water or equivalent aqueous vehicle. The film-forming agent may be a synthetic or natural resin or like material, including various polymeric products and indeed any substance which is capable of dispersion as a suspension or emulsion in water and which after application to a desired surface will form a coherent film or coating on such surface upon evaporation of the water. In some such compositions, such as those embodying acrylic ester resins, where the suspended film-forming agent may be regarded as essentially in solid form, the dispersion can be designated a latex, whereas other materials involve a liquid agent or liquid-carried agent, correspondingly definable as an emulsion in water. A water emulsion of an alkyd resin in an organic solvent is an example of the latter type.

Other instances of so-called latex compositions are water dispersions of styrene-butadiene resin and water dispersions of vinyl acetate resin, each of these being polymeric material and each being present as the dispersed phase in the latex. Latices and emulsions of these and other kinds are widely available and have heretofore been used, e.g. with non-metallic pigments, for the preparation of paints or other complete coating materials having the desirable aqueous characteristics described above. The present invention is designed for incorporation of aluminum pigment in any such base composition, whether regarded as of latex or emulsion type or as of some combined intermediate or other kind, where there is an aqueous dispersion of film-forming material. Other substances, pigments or coloring material may of course be included, when and if corresponding characteristics are desired.

The resulting aluminum-pigmented coating materials are applicable to various uses, and may be made to have characteristics specially appropriate for specific purposes, as will become readily apparent to those familiar with the art. Thus metallic paints of different types may be prepared, suitable for indoor or exterior work. Another important type of use is in coating paper or like material, i.e. to provide a bright metallic surface, preferably one which can receive printing with special or conventional inks. Coating materials prepared according to the invention are suitable for application to paper by conventional brushing, spraying, hand-roller coating, or the like.

Although a presently common form of aluminum pigment paste is one where the aluminum powder is circumstanced to have a non-leafing property, the present invention is applicable to both leafing and non-leafing pigments, and indeed represents valuable improvement, in providing aluminum-containing water-base compositions that yield an effectively water-resistant coating, regardless of the type of pigment used and regardless of actual achievement of leafing. Thus even where the composition or its use may be such that leafing does not occur, or is incomplete (despite the employment of a so-called leafing pigment in some cases), there is effective realization of highly important characteristics of aluminum-pigmented coatings, as to protection, covering power and the like.

On the other hand, compositions can be produced in accordance with the invention, to have good leafing action under a number of conditions of use, in contrast to a failure of leafing in at least some prior attempts to put aluminum pigment in water-dispersion coating materials. It will be understood that leafing action in an applied coating means that the individual flake-like particles of aluminum metal tend to rise to or near the outer surface of the film, lying essentially flatwise in such surface and there leafing together, whereby the finished coating appears as an essentially continuous bright metal surface.

Suitable non-leafing aluminum flakes for the practices of this invention include those commercially available with the following properties:

| Color | Bright sparkling silver, controlled for color and flake size distribution. |
|---|---|
| Non-volatile content | 60% minimum. |
| Screen Analysis (wet method) | 98% minimum through 325 mesh. |
| Specific Gravity | 1.38 |
| Bulking Gallons per Pound | 0.087 |

It will also be appreciated that the invention is applicable to various grades of aluminum powders and flakes whether of a mesh size (i.e. as passing through a screen of given mesh) conventionally employed for paints or similar coatings, or of finer mesh requirements as used for special purposes such as inks. The term aluminum pigment is generally employed herein to mean a metal powder product wherein the particles are essentially in flake form, suitable for use as pigment in coatings.

Although the invention, in an important aspect, resides in the completed coating compositions, a preferred embodiment of the invention is concerned with new aluminum or similar preparations, which contain added agents as described herein above and which are capable of admixture with water-dispersed coating bases, to constitute finished preparations. Such novel pigment compositions are appropriate as articles of commerce in the same way as metal pigment pastes at the present time, e.g. for sale to manufacturers or ultimate users of metal paints or other coating compositions, to make up such paint or composition by admixture of the pigment preparation to an appropriate coating or other base.

Specific examples of aluminum flake flowable coating formulations, falling within the scope of the invention, were prepared and tested under laboratory controlled conditions, as follows:

EXAMPLE 1

A dry, non-leafing aluminum flake powder 325 mesh grade, specific gravity 1.38 (sold as Sparkle Silver 3199-AR by Silberline Manufacturing Company, Lansford, Pennsylvania, U.S.A.) was mixed in an amount of 15.0 grams with 5.0 grams of linseed fatty acid ester of sorbitan (sold as IL-627 by Atlas Chemical Industries, Inc., Wilmington, Delaware) and 15.0 grams of ethoxylated linseed fatty acid ester of sorbitan which in turn was mixed with 100 grams of 100 percent solids acrylic resin (sold as Arlon 465 by Ashland Chemical Company) 10.0 grams of urea-formaldehyde resin (sold as XM-1116 by American Cyanamid) 10 grams of ammonium hydroxide and 3.0 grams of an alkyl aryl sulfonate (sold as G-3300 by Atlas Chemical Industries, Inc., Wilmington, Delaware) for 15 minutes at high speed. Following the addition of 4.0 grams of defoamer (sold as L-475 and Y-200 by Drew Chemical Company) the mixing was continued for 5 minutes, followed by the addition of 10 grams of butyl cellosolve. After 5 minutes of further mixing 150 grams of water were added, followed by still further mixing and the adjustment of the pH to 8.6–8.8 with ammonium hydroxide. The resultant composition was sprayed upon a surface using a syphon gun at 80 pounds per square inch flash and baked for 15 to 30 minutes at 175°C.

The following Examples were performed with a surfactant combination of 5 parts of linseed fatty acid ester of sorbitan to 1 part of ethoxylated linseed fatty acid ester, all with 2 grams of non-leafing aluminum to demonstrate that no gas ebullition in distention of a balloon fitted to a 250 milliliter flask:

| EXAMPLE NO. | AMOUNT OF SURFACTANT COMBINATION | 16 HOURS AT ROOM TEMPERATURE | 16 HOURS AT 44°C |
|---|---|---|---|
| 2 | Water + NH3 + 2 gr. AA N.L.AL. + 0.2 gr. M&T 629. | Very little gas seen. No destruction of Al. | Same as room temperature. |
| 3 | Water + NH3 + 2 gr. AA N.L. AL. + 0.5 gr. M&T 629. | No gassing, no change. | Same as room temperature. |
| 4 | Water + NH3 + 2 gr. 3333 AR N.L.AL. + 0.5 gr. M&T 629. | No gas, no change | Unchanged. |
| 5 | Water + NH3 + 2 gr. 3199 0.5 gr. M&T 629. | Slight gas. N.L.AL.. | Slight gas. |
| 6 | Water + NH3 + 3199AR 2 gr. N.L. AL. + 0.5 gr. M&T 629 | No gas. | No gas. |
| 7 | Water + NH3 + 2 gr. 3333AR + 0.5 gr. M&T 629. | Slight gas. | Unchanged. |

When the foregoing Examples were repeated in the absence of the surfactant combination of this invention the aluminum was completely destroyed and gas was evolved.

We claim:

1. An aqueous non-leafing aluminum flake composition containing a water reducible film forming polymer with non-leafing aluminum particles dispersed therein in the presence of a surfactant combination consisting essentially of:
   a. at least one partial ester of a long chain fatty acid exhibiting from 12 to 18 carbon atoms and a polyhydroxylic organic compound selected from the group consisting of hexahydric alcohols, internal ethers of hexahydric alcohols, external ethers of hexahydric alcohols and mixtures of internal and external ethers of hexahydric alcohols; and
   b. a polyoxyethylene ether of at least one partial ester of a long chain fatty acid exhibiting from 12 to 18 carbon atoms and a polyhydroxylic organic compound selected from the group consisting of hexahydric alcohols, internal ethers of hexahydric alcohols, external ethers of hexahydric alcohols and mixtures of internal and external ethers of hexahydric alcohols.

2. The composition of claim 1 wherein said polyhydroxylic compound is sorbitan.

3. The composition of claim 1 wherein the ratio of the weight of fatty acid ester of polyhydric organic compound to the weight of ethoxylated fatty acid ester of polyhydric organic compound is from 1 to 10.

4. The composition of claim 1 wherein the weight ratio of surfactant combination to non-leafing aluminum ranges from 0.15 to 0.45.

5. An aqueous non-leafing aluminum flake composition containing a water reducible film forming polymer with non-leafing aluminum particles dispersed therein in the presence of a surfactant combination consisting essentially of:
   a. a fatty acid ester of sorbitan; and
   b. an ethoxylated fatty ester of sorbitan.

6. An aqueous coating composition comprising a water reducible film forming polymer with non-leafing aluminum particles dispersed therein in the presence of a surfactant combination consisting essentially of:
   a. at least one partial ester of a long chain fatty acid exhibiting from 12 to 18 carbon atoms and a polyhydroxylic organic compound selected from the group consisting of hexahydric alcohols, internal ethers of hexahydric alcohols, external ethers of hexahydric alcohols and mixtures of internal and external ethers of hexahydric alcohols; and
   b. a polyoxyethylene ether of a partial ester of a long chain fatty acid exhibiting from 12 to 18 carbon atoms and a polyhydroxylic organic compound selected from the group consisting of hexahydric alcohols, internal ethers of hexahydric alcohols, external ethers of hexahydric alcohols and mixtures of internal and external ethers of hexahydric alcohols.

7. The composition of claim 6 wherein said film forming polymer includes an acrylic polymer.

8. The composition of claim 6 wherein said polyhydroxylic compound is sorbitan.

9. The compositions of claim 6 wherein the ratio of the weight of fatty acid ester of a polyhydric organic compound to the weight of ethoxylated fatty acid ester of a polyhydric organic compound is from 1 to 10.

10. The composition of claim 6 wherein the weight ratio of surfactant combination to non-leafing aluminum ranges from 0.15 to 0.45.

11. An aqueous coating composition comprising a water reducible film forming material with non-leafing aluminum flake particles dispersed therein in the presence of a surfactant combination consisting essentially of:
   a. a fatty acid partial ester of sorbitan; and
   b. an ethoxylated fatty acid partial ester of sorbitan.

* * * * *